July 4, 1961
G. H. T. CLARKE ET AL
2,991,049
MIXING APPARATUS
Filed Sept. 15, 1958
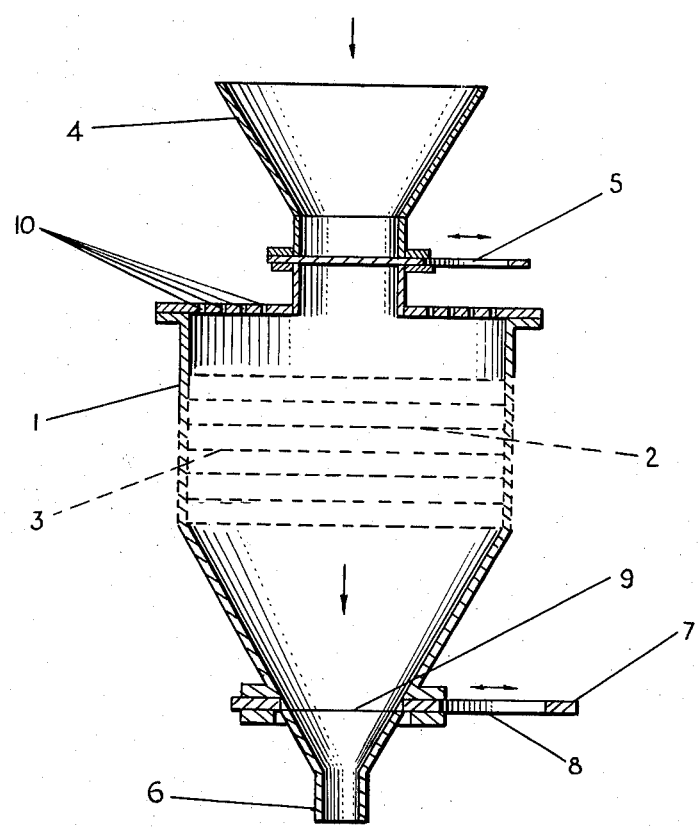
INVENTORS:
Gordon Herbert T. Clarke
David Robin Lander,
BY Cushman, Darby + Cushman
ATTORNEYS.

United States Patent Office 2,991,049
Patented July 4, 1961

2,991,049
MIXING APPARATUS
Gordon Herbert Thoday Clarke, Hatfield, and David Robin Lander, Codicote, England, assignors to Imperial Chemical Industries Limited, London, England, a corporation of Great Britain
Filed Sept. 15, 1958, Ser. No. 761,095
Claims priority, application Great Britain Mar. 7, 1958
1 Claim. (Cl. 259—4)

This invention relates to a mixing apparatus and more particularly to apparatus of the type described in application No. 760,429, filed September 11, 1958, now abandoned.

Application No. 760,429 describes a process for mixing measured amounts of at least two materials in the form of granules of substantially uniform size, the size of the granules of the different materials being the same or different, that comprises allowing the measured amounts of the materials to fall simultaneously through a series of screens, each screen of said series being separated from the next by an air gap and the apertures through at least one of the screens being laterally displaced relative to the apertures of a parallel screen adjacent thereto, the size of the apertures and the extent of said lateral displacement being such that the maximum width of the combined vertical aperture through the series of screens does not exceed 4 times the maximum dimension of the granules, and the measured amount of each material being supplied to the series of screens at a constant rate such that the whole amount of each material takes substantially the same time to pass through the screens.

By the term "granules of substantially uniform size" it is meant that the materials occur as grains or units of substantially uniform size or have been cut or otherwise formed into granules or pieces by processes intended to give a uniform granular material, for example by cube-cutting processes or by the die-face cutting of thermoplastic materials extruded through rod-forming orifices; or that the materials have been screened to separate granules covering a certain range of particle size. It is however within the scope of the invention to use granular materials containing a minor proportion of undersized or oversized granules, such as "fines" and "longs" occurring in many materials that have been cut into granular form.

In accordance with the present invention, we have found that the efficiency of the mixing process described in said application may be increased by subjecting the granules collecting below the series of screens to a blast of gas sufficient at least to raise some of them a part of the way back through the series of screens.

The outlet for the gas is preferably above the uppermost screen of the series.

Apparatus constructed in accordance with the present invention is illustrated diagrammatically in the accompanying drawing, in which:

1 represents the containing wall of the mixing apparatus; 2 and 3 are alternating woven wire screens; 4 is a feed hopper provided with a valve, 5. 6 is the outlet for the mixed granules and the inlet for the gas, this outlet-inlet being provided with a valve 7, which includes an aperture 8 through which the granules may fall when the valve is in the open position, and a wire gauze 9 through which air but not granules may pass when the valve is closed; and 10 are outlets through which the spent gas leaves the mixing chamber.

A number of modifications may be made in the apparatus particularly described; among them are the modifications in the grid or screen system mentioned in said copending application No. 760,429.

In normal operation of the apparatus of our invention, the blast of gas blowing through the mass of granules collecting beneath the system of screens causes a proportion of the granules to be continuously carried upwards, and by their collisions with the wires of the screens and with the particles falling downwards the granules are subjected to an intensified mixing process. When their upward momentum is spent, the granules fall back through the screens, and are further deflected and mixed by collision with the wires and with upwardly moving particles.

The blast of gas is preferably of such force that some of the particles may be seen to be rising to a level just above the uppermost screen.

In operating the mixing apparatus in accordance with the present invention it is not necessary to supply the measured amounts of each material at constant rates over the same time interval, as described in copending application No. 760,429. The materials may be fed rapidly to the screen system, together or separately, and the air blast need not be turned on until they have passed once through the system. Application of the air blast for only a few seconds, 8 to 15 seconds for example, is usually sufficient to produce complete mixing of plastic materials in usual granular forms.

The following example illustrates but in no way limits our invention.

*Example*

A mixing apparatus substantially as described with reference to the accompanying drawing was used to mix uncoloured polythene granules with coloured master batch granules in a proportion of 90:10 by weight. The uncoloured and coloured granules both had the form of $\frac{1}{8}$ in. cubes. 6 staggered woven screens were used in a mixing chamber 20" x 20" x 20", the screens being formed of wires $\frac{1}{16}$ in. thick and $\frac{1}{2}$ in. apart in both directions. The granules were fed in the desired proportions in batches of 5 lb. total weight. After the granules had been admitted to the mixing chamber, air was supplied for 10 seconds at 40 p.s.i. through a $\frac{1}{4}$ in. diameter jet. The mixed granules were then removed, and counts of a number of samples showed that a completely uniform mixture had been obtained.

We claim:

Apparatus of the character described for the physical mixing of measured amounts of granular materials comprising: a housing having a longitudinal axis and including a bottom discharge outlet with valve means therein, a top wall transverse to said longitudinal axis including means for supplying granular material downwardly into said housing, and a plurality of gas discharge apertures in said top wall spaced over substantially the entire surface thereof; a series of longitudinally spaced apart stationary screens in said housing, the apertures through at least one of said screens being laterally displaced relative to the apertures of a stationary screen adjacent thereto; means providing an upwardly directed blast of gas through said screens to blow the granules in said housing upwardly a sufficient amount to raise some of the granules through said screens whereby the falling granules collide with the wires of the screen and are mixed with the upwardly blown granules throughout the surface area of said screens due to the passage of the gas through said gas discharge apertures, and the mixed granules drop out of said discharge outlet when said valve means is opened.

(References on following page)

References Cited in the file of this patent

UNITED STATES PATENTS

| | | |
|---|---|---|
| 832,400 | Lyons | Oct. 2, 1906 |
| 1,072,143 | Mills et al. | Sept. 2, 1913 |
| 1,571,926 | Babka | Feb. 9, 1926 |
| 1,834,917 | Gilchrist | Dec. 1, 1931 |
| 2,577,920 | Russell et al. | Dec. 11, 1951 |
| 2,823,219 | Mungen | Feb. 11, 1958 |

FOREIGN PATENTS

| | | |
|---|---|---|
| 117,592 | Austria | Apr. 25, 1930 |